(12) United States Patent
Tanida (10) Patent No.: US 11,938,758 B2
(45) Date of Patent: Mar. 26, 2024

(54) TIRE

(71) Applicant: Sumitomo Rubber Industries, Ltd., Hyogo (JP)

(72) Inventor: Ken Tanida, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 17/584,251

(22) Filed: Jan. 25, 2022

(65) Prior Publication Data

US 2022/0250413 A1 Aug. 11, 2022

(30) Foreign Application Priority Data

Feb. 9, 2021 (JP) ................................ 2021-019221

(51) Int. Cl.
*B60C 11/00* (2006.01)
*B60C 11/03* (2006.01)
*B60C 11/13* (2006.01)

(52) U.S. Cl.
CPC ...... *B60C 11/0083* (2013.01); *B60C 11/0306* (2013.01); *B60C 11/1376* (2013.01); *B60C 11/0304* (2013.01); *B60C 2011/0353* (2013.01); *B60C 2011/0372* (2013.01)

(58) Field of Classification Search
CPC . B60C 11/1376; B60C 11/0083; B60C 11/04; B60C 11/0304; B60C 11/0309; B60C 11/0306; B60C 2011/0386; B60C 2011/0388; B60C 2011/0358; B60C 11/03; B60C 2011/039; B60C 2011/0381; B60C 2011/0838

See application file for complete search history.

(56) References Cited

U.S. PATENT DOCUMENTS

| 9,815,335 | B2 | 11/2017 | Nagahara |
| 10,427,467 | B2 | 10/2019 | Takahashi |
| 2009/0294003 | A1* | 12/2009 | Horiuchi ................ B60C 11/13 |
| | | | 152/209.23 |
| 2015/0231929 | A1* | 8/2015 | Nagahara .............. B60C 11/042 |
| | | | 152/209.8 |

(Continued)

FOREIGN PATENT DOCUMENTS

| EP | 3 552 845 A1 | 10/2019 |
| JP | H03-136908 A | 6/1991 |
| JP | 2020-111261 A | 7/2020 |

OTHER PUBLICATIONS

The extended European search report issued by the European Patent Office dated Jun. 28, 2022, which corresponds to European Patent Application No. 22151011.8-1012 and is related to U.S. Appl. No. 17/584,251.

*Primary Examiner* — Cedrick S Williams
*Assistant Examiner* — Thomas Frank Schneider
(74) *Attorney, Agent, or Firm* — Studebaker & Brackett PC (57) ABSTRACT

A tire comprises a tread portion axially divided by circumferential grooves into a first middle land portion, a crown land portion and a second middle land portion. Each land portion has a profile protruding radially outwardly from a reference tread profile. The maximum protrusion amount of the second middle land portion's profile is larger than the maximum protrusion amount of the crown land portion's profile which is larger than the maximum protrusion amount of the first middle land portion's profile.

12 Claims, 6 Drawing Sheets

(56) References Cited

U.S. PATENT DOCUMENTS

| | | | |
|---|---|---|---|
| 2016/0009142 A1 | 1/2016 | Tada | |
| 2016/0303919 A1* | 10/2016 | Yamaoka | B60C 11/1307 |
| 2017/0015144 A1* | 1/2017 | Ogihara | B60C 11/1204 |
| 2017/0057296 A1* | 3/2017 | Takemori | B60C 11/01 |
| 2017/0182849 A1 | 6/2017 | Uchida | |
| 2017/0203614 A1* | 7/2017 | Kato | B60C 11/042 |
| 2017/0210174 A1* | 7/2017 | Suga | B60C 11/00 |
| 2018/0264890 A1* | 9/2018 | Ueyama | B60C 11/0306 |
| 2018/0370290 A1* | 12/2018 | Hirosue | B60C 11/1263 |
| 2019/0135044 A1* | 5/2019 | Harada | B60C 11/03 |
| 2019/0291515 A1* | 9/2019 | Kawasaki | B60C 11/1204 |
| 2019/0308468 A1* | 10/2019 | Kitano | B60C 11/13 |
| 2020/0361245 A1* | 11/2020 | Iida | B60C 11/0306 |

\* cited by examiner

TIRE

FIELD OF THE INVENTION

The present disclosure relates to a tire, more particularly to a tread pattern with land portions having different profiles.

BACKGROUND ART

Patent Document 1 below discloses a tire in which the ground contacting surface of a middle land portion protrudes radially outwardly from a reference tread profile. Thereby, the contact pressure acting on the circumferential edges on both sides of the middle land portion is reduced to improve fuel efficiency and braking performance on dry road surfaces. Patent Document 1: Japanese Patent Application Publication No. 2020-111261

SUMMARY OF THE INVENTION

Problems to be Solved by the Invention

On the other hand, in order to fully derive designed desirable performances from a tire, there has been proposed a tire of which position on a vehicle is specified (namely, a tire specified about which side of the tire is to be positioned inboard of a vehicle).

When such a tire employs land portions of which ground contacting surface protrudes radially outwardly from a reference tread profile as disclosed in Patent Document 1, there is a tendency that uneven wear occurs in a specific land portion.

The present disclosure was made in view of the above problems, and a main object of the present disclosure is to provide a tire in which uneven wear resistance is improved although the position of the tire on a vehicle is specified.

Means for Solving the Problems

According to the present disclosure, a tire comprises a tread portion having a first tread edge to be positioned inboard of a vehicle and a second tread edge to be positioned outboard of the vehicle, wherein the tread portion is provided with circumferential grooves extending continuously in the tire circumferential direction to axially divide the tread portion into land portions, the land portions include a crown land portion, a first middle land portion adjacent to the crown land portion on the first tread edge side thereof, and a second middle land portion adjacent to the crown land portion on the second tread edge side thereof, and in a meridian cross section of the tire under a normal state of the tire, the crown land portion, the first middle land portion and the second middle land portion respectively have a crown profile, a first middle profile and a second middle profile which protrude radially outwardly from respective reference tread profiles, wherein a maximum protrusion amount of the first middle profile from the reference tread profile therefor is larger than a maximum protrusion amount of the crown profile from the reference tread profile therefor which is larger than a maximum protrusion amount of the second middle profile from the reference tread profile therefor.

Effects of the Invention

In the tire according to the present disclosure, as the maximum protrusion amounts are uniquely defined, the uneven wear resistance of the tire can be improved.

DETAILED DESCRIPTION OF THE INVENTION

An embodiment of the present disclosure will now be described in detail in conjunction with accompanying drawings.

The present disclosure is suitably applied to pneumatic tires, especially, winter tires for passenger cars although the present disclosure is not limited to such intended end-usage and pneumatic tires.

Figure 1:
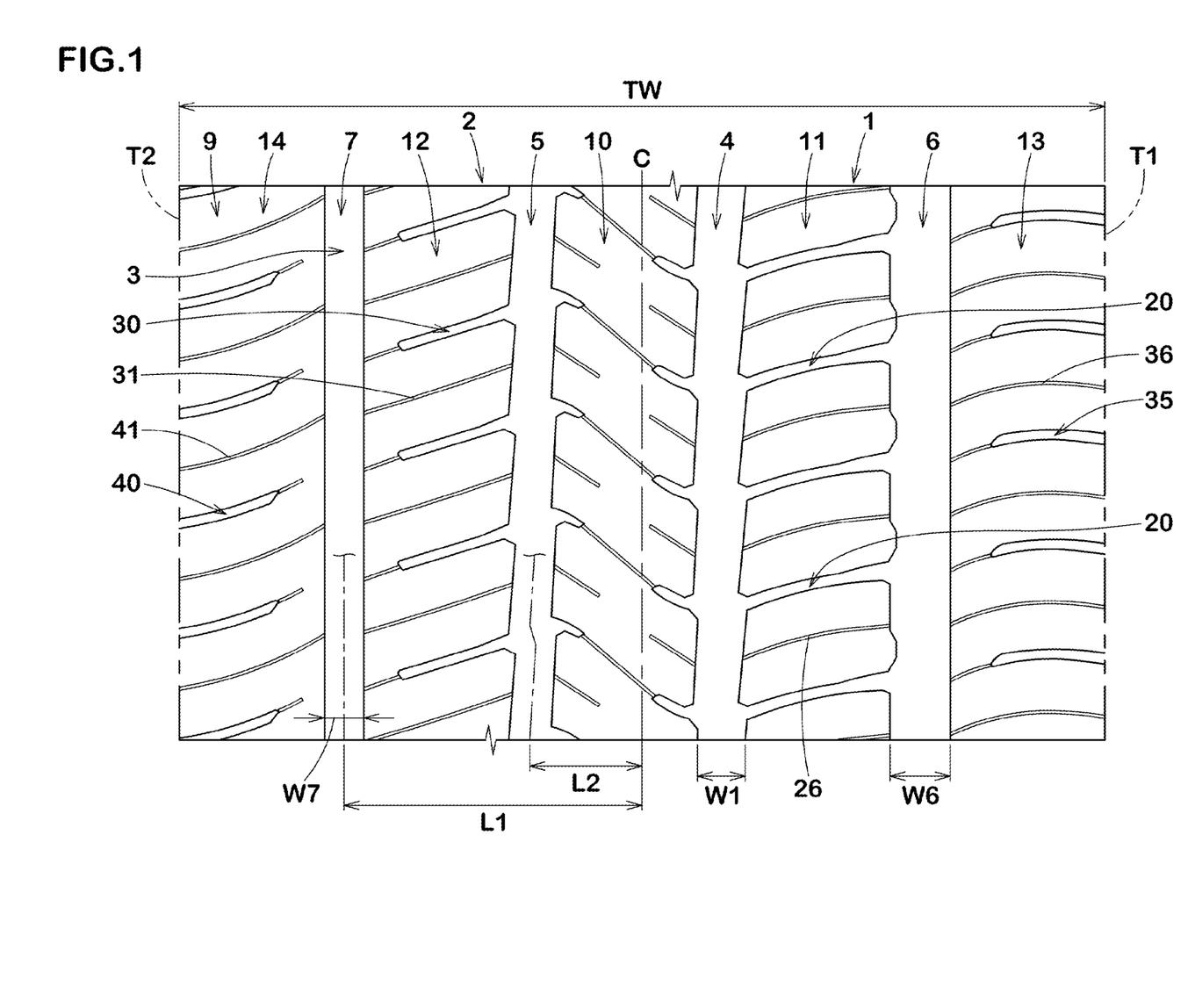
FIG. 1 is a developed partial view of the tread portion of a tire as an embodiment of the present disclosure.

FIG. 1 is a developed partial view of a tread portion 2 of a pneumatic tire 1 as an embodiment of the present disclosure.

As shown in FIG. 1, the tread portion 2 is provided with a tread pattern asymmetric about the tire equator C, and the position of the tire on a vehicle is specified about which side of the tire is to be positioned inboard or outboard of the vehicle. Thus, the tread portion 2 has a first tread edge T1 to be positioned inboard of a vehicle, and a second tread edge T2 to be positioned outboard of the vehicle.

The direction of the tire when mounted on the vehicle is indicated in, for example, the sidewall portion (not shown) of the tire by using characters and/or symbols.

The first tread edge T1 and the second tread edge T2 are the axial outermost edges of the ground contacting patch of the tire which occurs when the tire under its normal state is contacted with a flat ground surface at a camber angle of 0 degree and loaded with a normal tire load.

Here, the normal state is such that the tire is mounted on a normal rim, and inflated to a normal pressure, but loaded with no tire load.

In this application, dimensions, positions and the like relating to the tire refer to those under the normal state unless otherwise noted.

The normal rim is a wheel rim specified for the tire by a standard included in a standardization system on which the tire is based, for example, the "normal wheel rim" in JATMA, "Design Rim" in TRA, and "Measuring Rim" in ETRTO. If there is no applicable standard, a wheel rim recommended by the tire manufacturer is used as the normal rim.

The normal pressure is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. If there is no applicable standard, an air pressure recommended by the tire manufacturer is used as the normal pressure.

The normal tire load is a tire load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. If there is no applicable standard, a maximum tire load specified by the tire manufacturer is used as the normal tire load.

The tread portion 2 is provided with a plurality of circumferential grooves 3 extending continuously in the tire circumferential direction and positioned between the first tread edge T1 and the second tread edge T2. By the circumferential grooves 3, the tread portion 2 is axially divided into a plurality of land portions 9.

The circumferential grooves 3 include a first crown circumferential groove 4, a second crown circumferential groove 5, a first shoulder circumferential groove 6, and a second shoulder circumferential groove 7.

The first shoulder circumferential groove 6 is provided on the most first tread edge T1 side among the circumferential grooves 3.

The second shoulder circumferential groove 7 is provided on the most second tread edge T2 side among the circumferential grooves 3.

The first crown circumferential groove 4 is provided between the first shoulder circumferential groove 6 and the tire equator C.

The second crown circumferential groove 5 is provided between the second shoulder circumferential groove 7 and the tire equator C.

The axial distance L1 from the tire equator C to the groove center line of each of the first shoulder circumferential groove 6 and the second shoulder circumferential groove 7 is preferably set in a range from 25% to 35% of the tread width TW.

The axial distance L2 from the tire equator C to the groove center line of each of the first crown circumferential groove 4 and the second crown circumferential groove 5 is preferably set in a range from 5% to 15% of the tread width TW.

The tread width TW is the axial distance between the first tread edge T1 and the second tread edge T2 measured under the normal state.

In the present embodiment, each of the circumferential grooves 3 extends straight in parallel with the tire circumferential direction, or in a wavy shape in which the groove center line slightly oscillates.

The groove width W1 of each of the circumferential grooves 3 is 3.0 mm or more, and preferably 3.0% to 7.0% of the tread width TW.

In the present specification, the groove width of the circumferential groove 3 is the distance between the groove edges on both sides measured in the direction orthogonal to the groove center line under the normal state. The groove edge is a boundary between the groove and the ground contacting surface of the adjacent land portion under the normal state.

The land portions 9 include a crown land portion 10, a first middle land portion 11, and a second middle land portion 12.

In addition, the land portions 9 in the present embodiment include a first shoulder land portion 13 and a second shoulder land portion 14.

The crown land portion 10 is defined between the first crown circumferential groove 4 and the second crown circumferential groove 5 and, in this present embodiment, disposed on the tire equator C.

The first middle land portion 11 is defined between the first crown circumferential groove 4 and the first shoulder circumferential groove 6, and disposed adjacently to the crown land portion 10 on the first tread edge T1 side.

The second middle land portion 12 is defined between the second crown circumferential groove 5 and the second shoulder circumferential groove 7, and disposed adjacently to the crown land portion 10 on the second tread edge T2 side.

The first shoulder land portion 13 is defined between the first shoulder circumferential groove 6 and the first tread edge T1.

The second shoulder land portion 14 is defined between the second shoulder circumferential groove 7 and the second tread edge T2.

Figure 2:
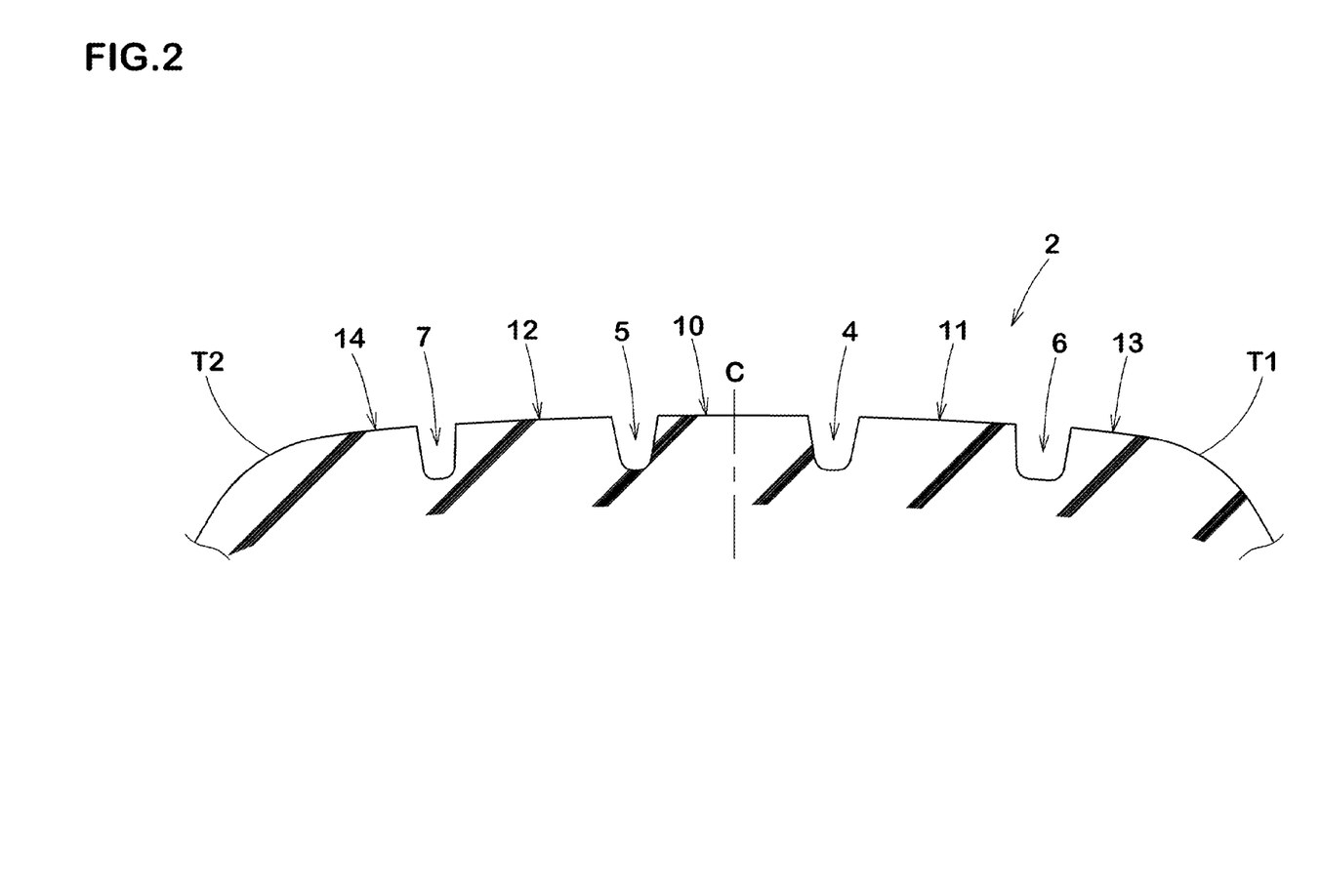
FIG. 2 is a schematic meridian cross-sectional view of the tread portion shown in FIG. 1.

FIG. 2 is a meridian cross-sectional view including the tire rotational axis schematically showing the tread portion 2 of the tire 1 under the normal state.

As shown in FIG. 2, a tread profile of the tread portion 2 as a whole is curved convexly toward the radially outside.

Figure 3:
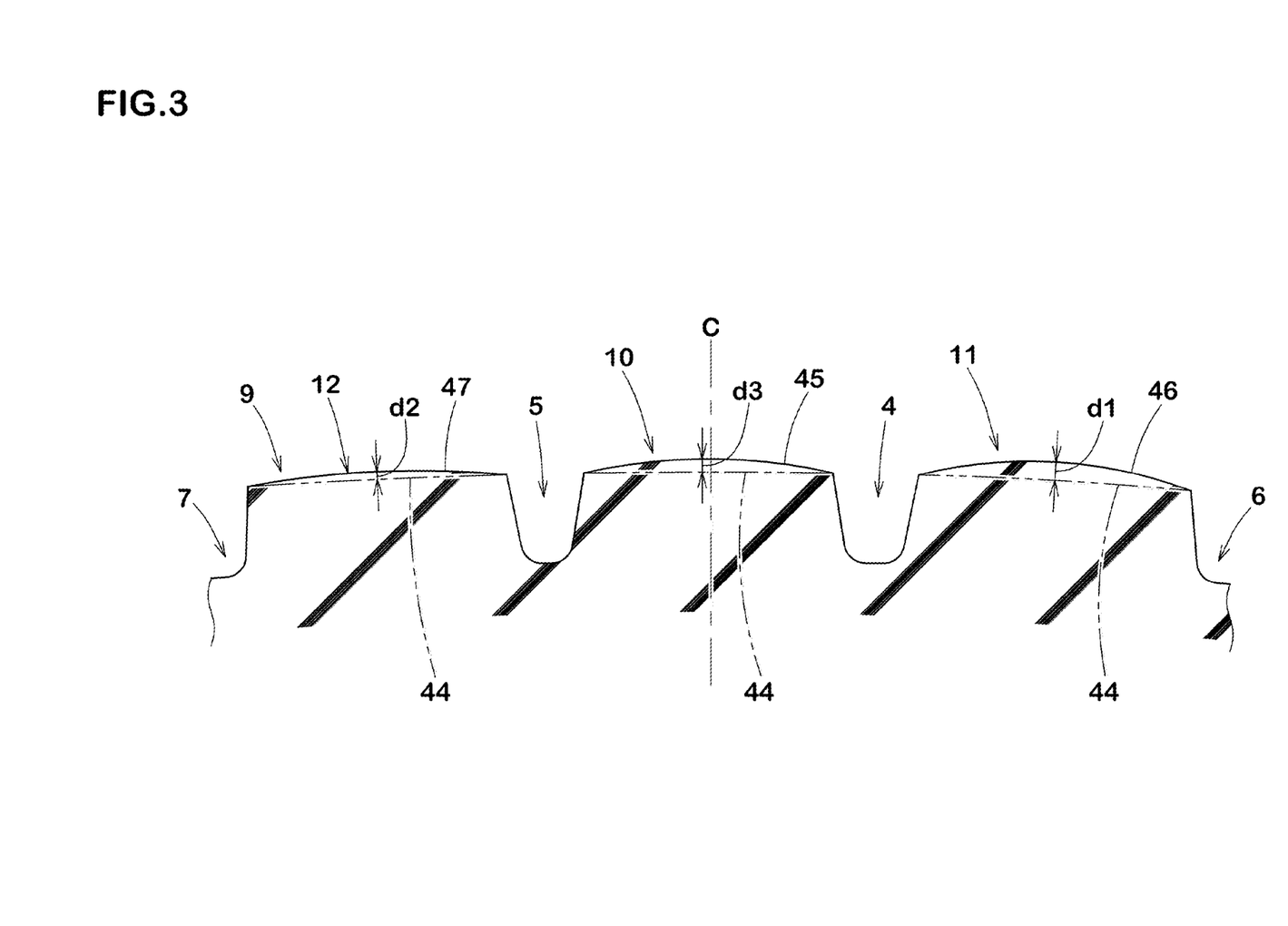
FIG. 3 is an enlarged cross-sectional view showing the crown land portion, the first middle land portion, and the second middle land portion shown in FIG. 2.

FIG. 3 shows cross sections of the crown land portion 10, the first middle land portion 11 and the second middle land portion 12.

As shown, the crown land portion 10, the first middle land portion 11, and the second middle land portion 12 respectively have a crown profile 45, a first middle profile 46, and a second middle profile 47 which protrude radially outwardly from respective reference tread profiles 44.

In FIG. 3, the curvatures of the crown profile 45, the first middle profile 46, and the second middle profile 47 are exaggeratingly shown as being larger than the actual curvatures for easy understanding.

The reference tread profile 44 of the first middle land portion 11 is a circular arc having a single radius and passing through three positions which are both edges of the ground contacting surface of the first middle land portion, and the groove edge on the tire equator C side of a circumferential groove axially inwardly adjacent to the first middle land portion 11 (namely, the first crown circumferential groove 4 in the present embodiment).

The reference tread profile 44 of the second middle land portion 12 is a circular arc having a single radius and passing through three positions which are both edges of the ground contacting surface of the second middle land portion, and the groove edge on the tire equator C side of a circumferential groove axially inwardly adjacent to the second middle land portion 12 (namely, the second crown circumferential groove 5 in the present embodiment).

The reference tread profile 44 of the crown land portion 10 is a circular arc which is one having a radius not smaller than the other of the following two circular arcs: a first circular arc having a single radius and passing through both edges of the ground contacting surface of the crown land portion 10 and a groove edge on the first tread edge T1 side of the first crown circumferential groove 4; and a second circular arc having a single radius and passing through both edges of the ground contacting surface of the crown land portion 10 and a groove edge on the second tread edge T2 side of the second crown circumferential groove 5.

In the present embodiment, the first circular arc and the second circular arc have the same radius.

According to the present disclosure, the maximum protrusion amount d1 of the first middle profile 46 from the reference tread profile 44 thereof is larger than the maximum protrusion amount d3 of the crown profile 45 from the reference tread profile 44 thereof, and the maximum protrusion amount d3 of the crown profile 45 from the reference tread profile 44 thereof is larger than the maximum protrusion amount d2 of the second middle profile 47 from the reference tread profile 44 thereof. Thereby, the tire 1 according to the present disclosure can be improved in uneven wear resistance performance. The reason for this is presumed as follows.

In the present disclosure, since the profile of each land portion 9 protrudes from the reference tread profile 44, the contact pressure acting on the circumferential edges of the land portion 9 can be reduced, and uneven wear occurred near the circumferential edges can be suppressed.

On the other hand, when the above profile is adopted in the tread portion 2 for which the position on the vehicle is specified, a land portion slightly inboard than the tire equator (corresponding to the first middle land portion 11 in the present embodiment) has a tendency to cause uneven wear. It is presumed that this is because the above-mentioned land portion is subjected to a relatively large ground pressure due to a slight negative camber generally applied to vehicles.

According to the present disclosure, by setting the maximum protrusion amounts of the profiles of the land portions 9 as described above, the contact pressure acting on the circumferential edges of the land portions 9 is adjusted in a well-balanced manner, and in particular, uneven wear of the first middle land portion 11 can be effectively suppressed. As a result, the tire 1 according to the present disclosure can exhibit excellent uneven wear resistance performance.

Hereinafter, additional features of the tire 1 of the present embodiment will be described in more detail. These features are preferable, but not essential for the tire according to the present disclosure.

It is preferable that, as shown in FIG. 1, the maximum groove width W7 of the second shoulder circumferential groove 7 is smaller than the maximum groove width W6 of the first shoulder circumferential groove 6. Specifically, the maximum groove width W7 is set in a range from 55% to 65% of the maximum groove width W6.
As a result, the air column resonance sound of the second shoulder circumferential groove 7 having a large influence on noise performance is reduced.

It is preferable that the maximum protrusion amount d3 of the crown profile 45, the maximum protrusion amount d1 of the first middle profile 46, and the maximum protrusion amount d2 of the second middle profile 47 are not more than 0.15 mm.
As a result, uneven wear of a central portion in the tire axial direction of each land portion can be suppressed.

The maximum protrusion amount d3 of the crown profile 45 is preferably in a range from 60% to 75% of the maximum protrusion amount d1 of the first middle profile 46.

The maximum protrusion amount d2 of the second middle profile 47 is preferably in a range from 25% to 40% of the maximum protrusion amount d1 of the first middle profile 46.
As a result, the ground contact pressure acting on each land portion becomes uniform, and its uneven wear is suppressed.

Figure 4:
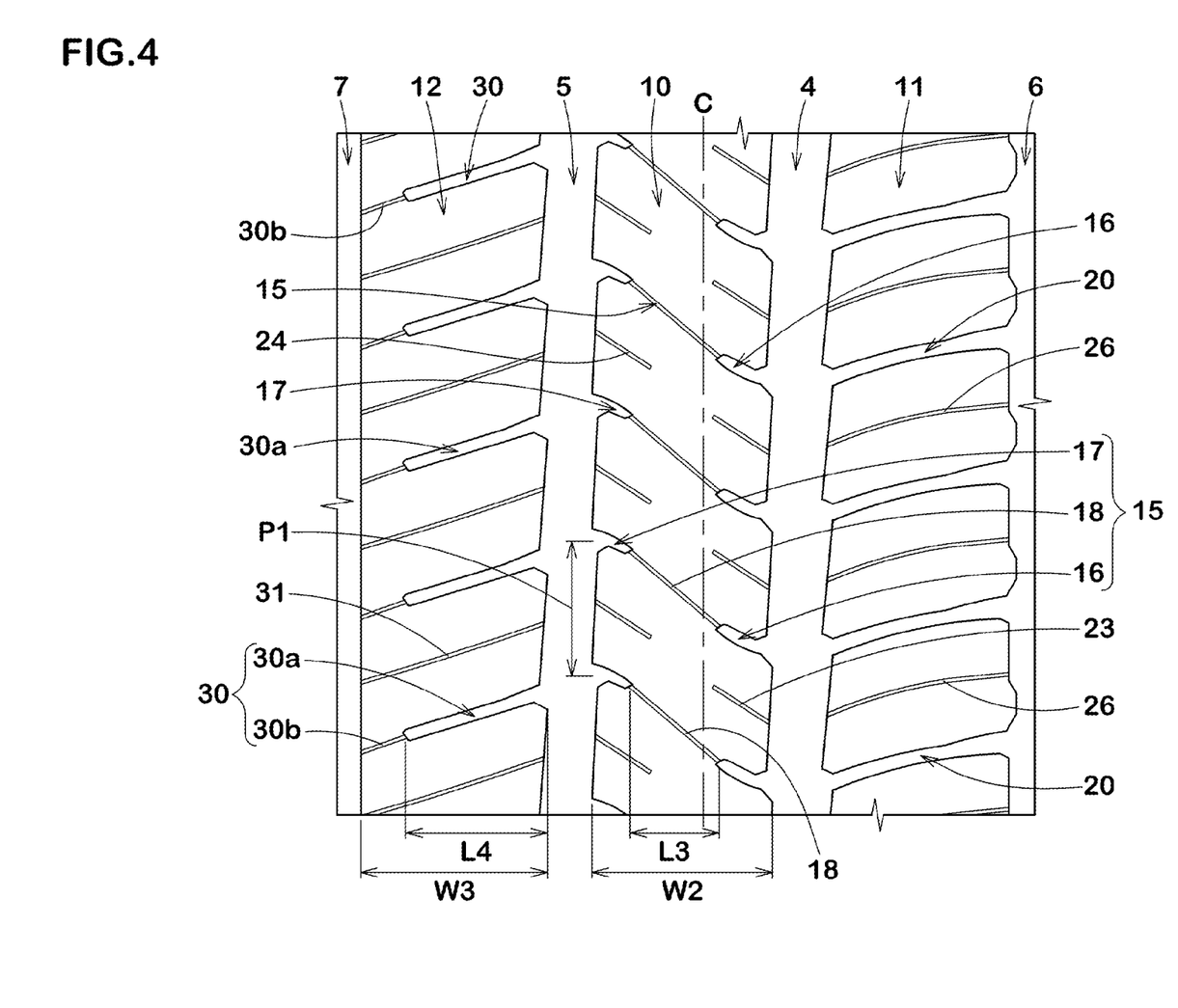
FIG. 4 is an enlarged view showing the crown land portion, the first middle land portion, and the second middle land portion shown in FIG. 1.

As shown in FIG. 4, each of the crown land portion 10, the first middle land portion 11, and the second middle land portion 12 is provided with lateral grooves extending in the tire axial direction.

In each of the crown land portion 10, the first middle land portion 11 and the second middle land portion 12, the number of pitches applied for the same lateral grooves disposed at the substantially same axial positions is, for example, 75 to 100, preferably 80 to 90 when counted over the entire circumference of the tire. As a result, uneven wear resistance and noise performance are improved in a well-balanced manner.

The crown land portion 10 is provided with crown lateral grooves 15.

The crown lateral grooves 15 extends across the entire axial width of the crown land portion 10, and are inclined with respect to the tire axial direction to a first direction (inclined downward to the right in each drawing).

The crown lateral groove 15 comprises a first axial end portion 16, a second axial end portion 17 and a central portion 18 extending therebetween. The groove width in the central portion 18 is smaller than the groove width in the first axial end portion 16 and smaller than the groove width in the second axial end portion 17.

In each of the crown lateral grooves 15, the maximum groove width in the central portion 18 is not more than 15%, preferably 3% to 15% of the maximum groove width in the first axial end portion 16 and the second axial end portion 17. Preferably, the central portion 18 is configured as a narrow groove portion having a groove width of not more than 1.5 mm.
As a result, the rigidity of the crown land portion 10 can be maintained, and the steering stability on dry roads is improved.

Hereinafter, unless otherwise noted, the "narrow groove portion" refers to a portion of a groove having a groove width of not more than 1.5 mm; the "narrow groove" refers to a groove having a groove width of not more than 1.5 mm over the entire length of the groove; and a groove not described as a narrow groove has a groove width larger than 1.5 mm.

In each lateral groove in the present embodiment, portions not described as the narrow groove portion have groove widths of about 2.0 to 4.0 mm, for example.

In the present embodiment, the central portions 18 of the crown lateral grooves 15 extend across the center line in the tire axial direction of the crown land portion 10.
In the present embodiment, the axial length L3 of each central portion 18 is in a range from 40% to 60% of the axial width W2 of the crown land portion 10. Such central portions 18 improve on-snow performance and noise performance in a well-balanced manner.

The central portions 18 are inclined with respect to the tire axial direction to the above-mentioned first direction. The angle $\theta 2$ of each central portion 18 with respect to the tire axial direction is not more than 45 degrees, preferably 35 to 45 degrees.

In each of the crown lateral grooves 15, the axial length of the first axial end portion 16 and the axial length of the second axial end portion 17 are smaller than the axial length L3 of the central portion 18 and in a range from 20% to 30% of the axial width W2 of the crown land portion 10.

The first axial end portion 16 and the second axial end portion 17 are inclined with respect to the tire axial direction to the first direction.

The angle of the first axial end portion 16 and the angle of the second axial end portion 17 with respect to the tire axial direction are smaller than the angle of the central portion 18 with respect to the tire axial direction, and in a range from 10 to 25 degrees, for example.

It is preferable that, as a result of the above-described configuration, the crown lateral groove 15 has a portion slightly convex to one side in the tire circumferential direction which is formed by the first axial end portion 16 and the central portion 18, and a portion slightly convex on the other side in the tire circumferential direction which is formed by the second axial end portion 17 and the central portion 18. By such configuration of the crown lateral groove 15, the first axial end portion 16 and the second axial end portion 17 can form hard compacted snow blocks together with the circumferential grooves, and thereby the traction performance when running on snow can be improved.

As the crown lateral groove 15 has the above-described configuration, it is preferable that the inclination angle thereof which is defined by the angle of a straight line drawn between both ends of the crown lateral groove 15 is set to be not more than 45 degrees, more preferably 20 to 40 degrees with respect to the tire axial direction.

Each of arrangement pitches P1 of the crown lateral grooves 15 in the tire circumferential direction is, for example, set in a range from 60% to 90% of the axial width W2 of the crown land portion 10. As a result, on-snow performance and noise performance are improved in a well-balanced manner.

Between every two of the crown lateral grooves 15 adjacent to each other in the tire circumferential direction, a first crown narrow groove 23 and a second crown narrow groove 24 are disposed.

The first crown narrow groove 23 extends from the first crown circumferential groove 4 and is terminated within the crown land portion 10.

The second crown narrow groove 24 extends from the second crown circumferential groove 5 and is terminated within the crown land portion 10.

The axial length of the first crown narrow groove 23 is, for example, set in a range from 80% to 120% of the axial length of the first axial end portion 16 of the crown lateral groove 15.

In the present embodiment, the second crown narrow groove 24 is terminated at an axial position on the first crown circumferential groove 4 side of the axially inner end of the second axial end portion 17 of the crown lateral groove 15. Such first crown narrow grooves 23 and second crown narrow grooves 24 can disperse the frequency spectrum of the noise generated when the crown land portion 10 contacts with the ground, and improve the noise performance.

The first crown narrow grooves 23 and the second crown narrow grooves 24 are inclined with respect to the tire axial direction to the above-mentioned first direction.

The angle of the first crown narrow groove 23 with respect to the tire axial direction, and the angle of the second crown narrow groove 24 with respect to the tire axial direction are smaller than the angle of the central portion 18 of the crown lateral groove 15 with respect to the tire axial direction.

In the present embodiment, the difference between the angles of the first crown narrow groove 23 and the central portion 18, and the difference between the angles of the second crown narrow groove 24 and the central portion 18, are not more than 15 degrees, preferably not more than 10 degrees.

Each of the first crown narrow grooves 23 and the second crown narrow grooves 24 is inclined at an angle of from 30 to 40 degrees with respect to the tire axial direction.

The first middle land portion 11 is provided with first middle lateral grooves 20.

The first middle lateral grooves 20 extend across the entire axial width of the first middle land portion 11, and inclined with respect to the tire axial direction to a second direction opposite to the first direction (inclined upward to the right in each drawing).

With respect to the tire axial direction, the first middle lateral grooves 20 are arranged at different angles than the crown lateral grooves 15. Thereby, it is possible to prevent noises generated by the lateral grooves 20 and 15 from resonating.

The angles of the first middle lateral grooves 20 with respect to the tire axial direction are, for example, set in a range from 10 to 30 degrees. Such first middle lateral grooves 20 help to further improve the noise performance.

In the present embodiment, in the plan view of the tread portion, as shown in FIG. 1 and FIG. 4, the crown lateral grooves 15 and the first middle lateral grooves 20 are arranged such that an extension of a straight line drawn between both axial ends of each crown lateral groove 15, and an extension of a straight line drawn between both axial ends of one of the first middle lateral grooves 20 which is axially adjacent to the each crown lateral groove 15 intersect within the groove width of the first crown circumferential groove 4.

More preferably, in the tire circumferential direction, the opening width of the crown lateral groove 15 at the first crown circumferential groove 4 overlaps with the opening width of the first middle lateral groove 20 at the first crown circumferential groove 4.

In other words, on both sides of the first crown circumferential groove 4, the open ends of the crown lateral grooves 15 are respectively aligned with the open ends of the first middle lateral grooves 20.

Thereby, the crown lateral grooves 15 and the first middle lateral grooves 20 can form hard compacted snow blocks at the intersections with the first crown circumferential groove 4, and thereby, excellent on-snow performance may be exhibited.

In the present embodiment, the first middle land portion 11 is provided with first middle narrow grooves 26.

The first middle narrow grooves 26 extend across the entire axial width of the first middle land portion 11, and are arranged in the tire circumferential direction alternately with the first middle lateral grooves 20.

In the present embodiment, the first middle narrow grooves 26 are inclined with respect to the tire axial direction to the above-mentioned second direction.

The first middle narrow grooves 26 extend in substantially parallel with the first middle lateral grooves 20 so that the angle difference therebetween is not more than 5 degrees at any axial position.

The angle of the first middle narrow grooves 26 with respect to the tire axial direction is smaller than the angle of the first crown narrow grooves 23 and smaller than the angle of the second crown narrow grooves 24. For example, the angle of the first middle narrow grooves 26 with respect to the tire axial direction is set in a range from 10 to 30 degrees.

The second middle land portion 12 is provided with second middle lateral grooves 30 and second middle narrow grooves 31 alternately in the tire circumferential direction.

In the present embodiment, the second middle lateral grooves 30 extend across the entire axial width of the second middle land portion 12, and are inclined with respect to the tire axial direction to the second direction. It is preferable that the angles of the second middle lateral grooves 30 with respect to the tire axial direction are smaller than the angle of the central portions 18 of the crown lateral grooves 15 with respect to the tire axial direction.

For example, the angles of the second middle lateral grooves 30 is set in a range from 10 to 30 degrees with respect to the tire axial direction. Thereby, it is possible to suppress the resonance of noise generated by the second middle lateral grooves 30 with noise generated by the crown lateral grooves 15.

In the present embodiment, the second middle lateral groove 30 comprises an axially inner groove portion 30a extending from the second crown circumferential groove 5, and an axially outer narrow groove portion 30b extending from the axially outer end of the axially inner groove portion 30a to the second shoulder circumferential groove 7.

In the present embodiment, the axially inner groove portion 30a extends across the center line in the tire axial direction of the second middle land portion 12.
The axial length L4 of the axially inner groove portion 30a in this example is in a range from 60% to 90% of the axial width W3 of the second middle land portion 12. Such axially inner groove portions 30a can improve on-snow performance and uneven wear resistance in a well-balanced manner.

In the present embodiment, it is preferable that, when each of the axially inner groove portions 30a is virtually-extended along the length direction thereof toward the crown land portion 10, the extension overlaps with the opening width of one of the second crown circumferential grooves 5 at the crown lateral groove 15. Thereby, it is possible to further improve on-snow performance.

In the present embodiment, the axially outer narrow groove portion 30b extends linearly from the axially inner groove portion 30a to the second shoulder circumferential groove 7, while inclining to the second direction.

In the present embodiment, the second middle narrow grooves 31 extend across the entire axial width of the second middle land portion 12 and are inclined with respect to the tire axial direction to the second direction. The second middle narrow grooves 31 extend in substantially parallel with the second middle lateral grooves 30 so that the angle difference therebetween is not more than 5 degrees at any axial position.
Such second middle narrow grooves 31 can improve on-snow performance while suppressing uneven wear of the second middle land portion 12.

Figure 5:
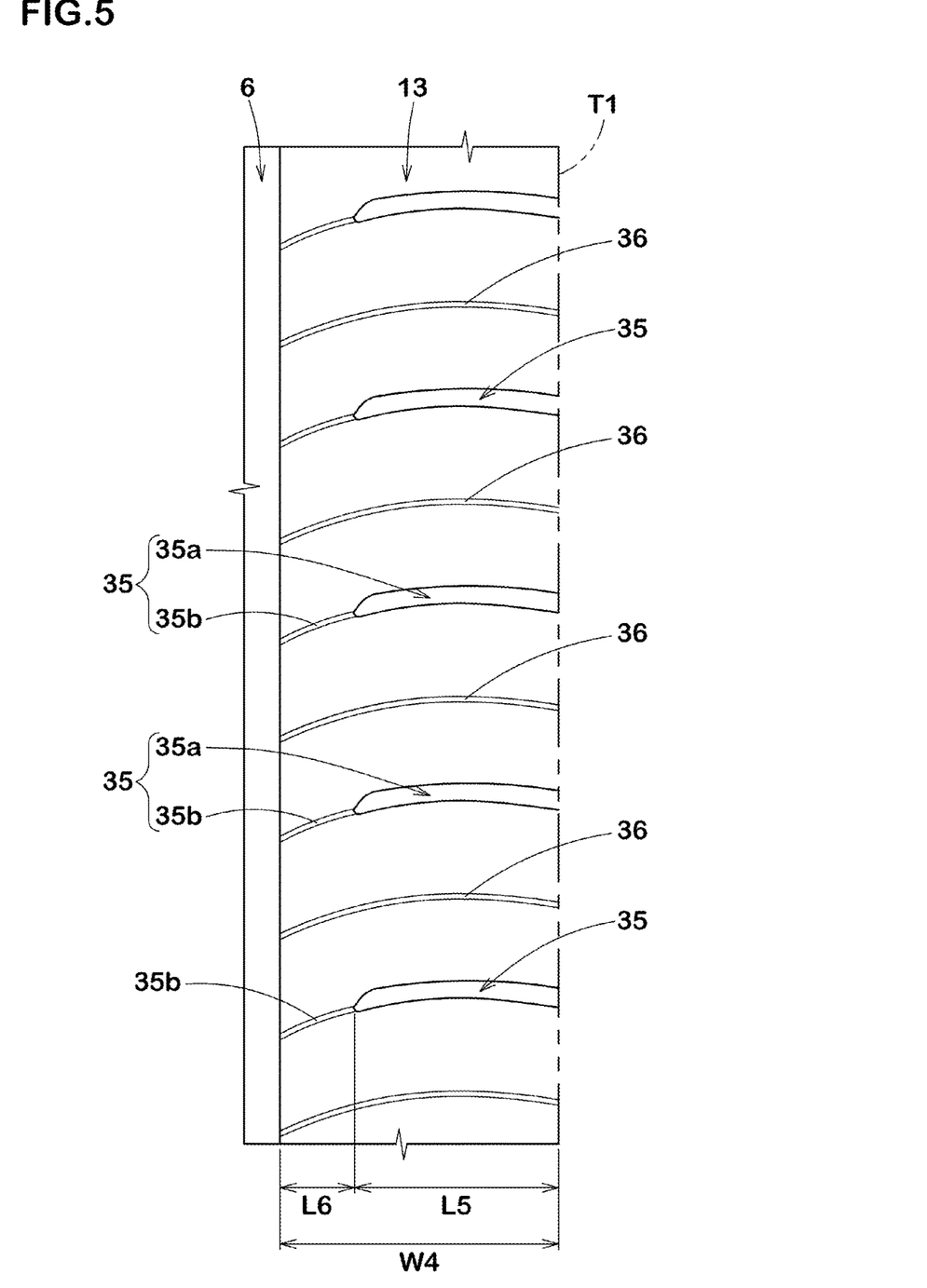
FIG. 5 is an enlarged view showing the first shoulder land portion shown in FIG. 1.

As shown in FIG. 5, the first shoulder land portion 13 is provided with first shoulder lateral grooves 35 and first shoulder narrow grooves 36 alternately in the tire circumferential direction.

In the present embodiment, the first shoulder lateral grooves 35 extend from the first tread edge T1 to the first shoulder circumferential groove 6. The first shoulder lateral grooves 35 in this example are curved convexly toward one side in the tire circumferential direction.

In the present embodiment, each of the first shoulder lateral grooves 35 comprises a main portion 35a on the first tread edge T1 side, and an axially inner end portion 35b extending from the first shoulder circumferential groove 6 to the axially inner end of the main portion 35a.

In the present embodiment, the main portion 35a extends across the center line in the tire axial direction of the first shoulder land portion 13. The axial length L5 of the main portion 35a in this example is in a range from 60% to 80% of the axial width W4 of the first shoulder land portion 13.
Thereby, it is possible to improve on-snow performance and noise performance in a well-balanced manner.

The groove width in the axially inner end portion 35b is smaller than the groove width in the main portion 35a, and preferably set in a range from 3% to 15% of the groove width in the main portion 35a.

In the present embodiment, the axially inner end portion 35b is configured as a narrow groove portion having a groove width of not more than 1.5 mm.
Thereby, the amount of air passing through the first shoulder lateral grooves 35 is reduced, and as a result, noise performance can be improved.

It is preferable that the axial length L6 of the axially inner end portion 35b is smaller than the axial length L3 of the central portion 18 of the crown lateral groove 15.
Specifically, the axial length L6 of the axially inner end portion 35b is in a range from 40% to 60% of the axial length L3 of the central portion 18. Thereby, it is possible to suppress the resonance of noise generated by the first shoulder lateral grooves 35 with noise generated by the crown lateral grooves 15.

In the present embodiment, the first shoulder narrow grooves 36 extends across the entire axial width of the first shoulder land portion 13. The first shoulder narrow grooves 36 are curved convexly toward one side in the tire circumferential direction.
Preferably, the first shoulder narrow grooves 36 extend in substantially parallel with the first shoulder lateral grooves 35 so that the angle difference therebetween is not more than 5 degrees at any axial position.
Such first shoulder narrow grooves 36 can improve on-snow performance while suppressing uneven wear of the first shoulder land portion 13.

Figure 6:
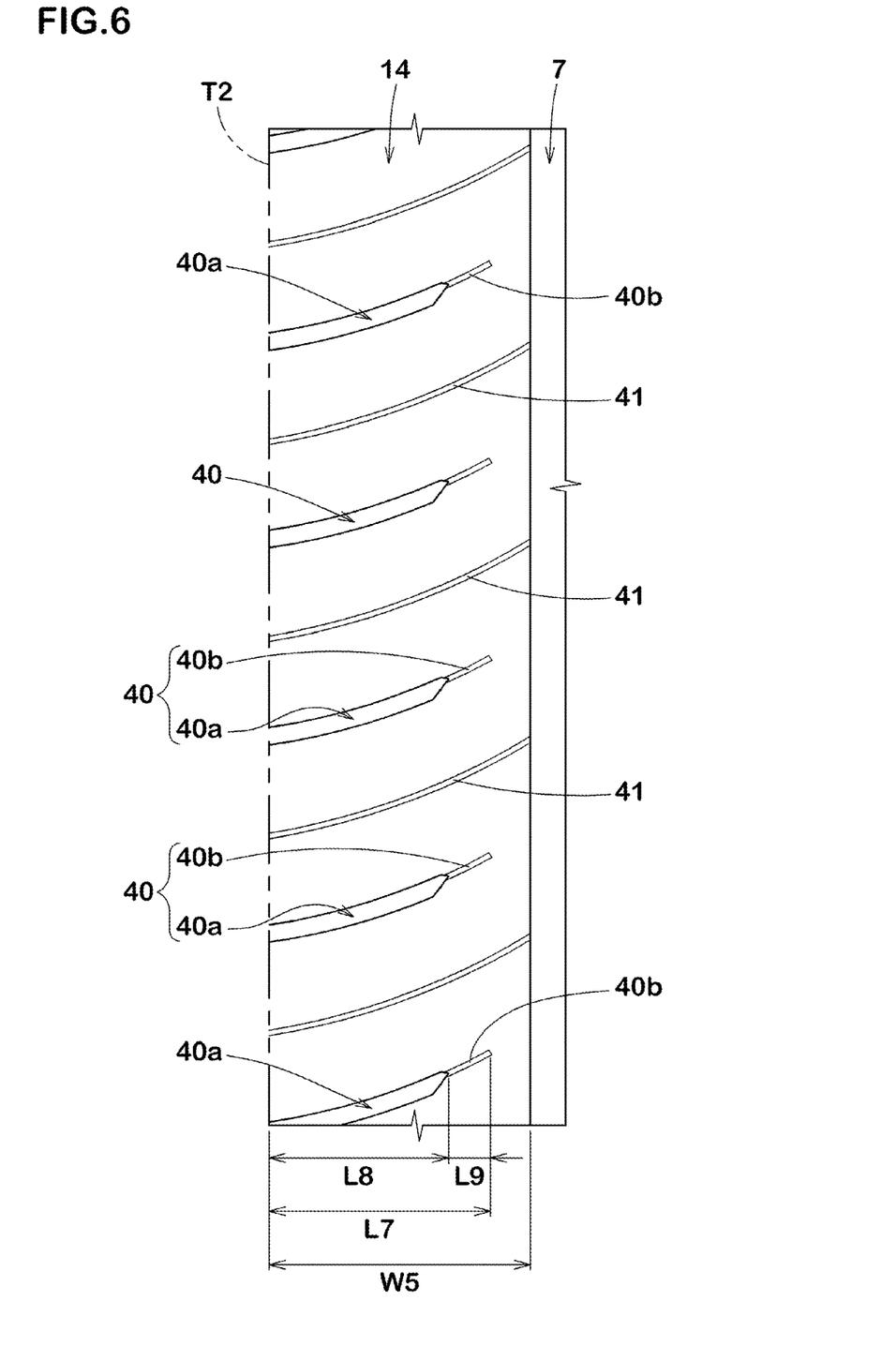
FIG. 6 is an enlarged view showing the second shoulder land portion shown in FIG. 2.

As shown in FIG. 6, the second shoulder land portion 14 is provided with second shoulder lateral grooves 40 and second shoulder narrow grooves 41 alternately in the tire circumferential direction.

The second shoulder lateral grooves 40 extend axially inwardly from the second tread edge T2 and are terminated within the second shoulder land portion 14. In the present embodiment, the axial length L7 of the second shoulder lateral grooves 40 is in a range from 75% to 90% of the axial width W5 of the second shoulder land portion 14. Thereby, the air in the second shoulder circumferential groove 7 is prevented from flowing out toward the second tread edge T2. Thus, it is possible to prevent the noise performance from deteriorating.

In the present embodiment, the second shoulder lateral groove 40 comprises a main portion 40a on the second tread edge T2 side, and an axially inner end portion 40b extending axially inwardly from the axially inner end of the main portion 40a. The groove width in the axially inner end portion 40b is smaller than the groove width in the main portion 40a.

In the present embodiment, the main portions 40a of the second shoulder lateral grooves 40 extend across the center line in the tire axial direction of the second shoulder land portion 14.
The axial length L8 of the main portion 40a is set in a range from 60% to 70% of the axial width W5 of the second shoulder land portion 14.
Thereby, on-snow performance and noise performance can be improved in a well-balanced manner.

In the present embodiment, the axially inner end portion 40b extends axially inwardly from the main portion 40a and is terminated within the second shoulder land portion 14.

The axial length L9 of the axially inner end portion 40b is in a range from 15% to 25% of the axial width W5 of the second shoulder land portion 14. Preferably, the axial length L9 is smaller than the axial length L3 of the central portion 18 of the crown lateral groove 15.

Thereby, it is possible to prevent noise generated by the second shoulder lateral grooves 40 from resonating with noise generated by the crown lateral groove 15.

In the second shoulder lateral grooves 40, the groove width in the axially inner end portion 40b is preferably set in a range from 3% to 15% of the groove width in the main portion 40a.

In the present embodiment, the axially inner end portion 40b is configured as a narrow groove portion having a groove width of not more than 1.5 mm. Thereby, it is possible to obtain excellent steering stability on dry roads.

In the present embodiment, the second shoulder narrow grooves 41 extend across the entire axial width of the second shoulder land portion 14. In the present embodiment, the second shoulder narrow grooves 41 extend in substantially parallel with the second shoulder lateral grooves 40 so that the angle difference therebetween is not more than 5 degrees at any axial position.

While detailed description has been made of a preferable embodiment of the present disclosure, the present disclosure can be embodied in various forms without being limited to the illustrated embodiment.

Comparison Tests

Pneumatic tires of size 225/65R17 having the tread pattern shown in FIG. 1 were experimentally manufactured as test tires (Working example tires Ex 1-Ex 10 and Comparative example tire Ref) by changing only the maximum protrusion amounts d1, d2 and d3 as shown in Table 1.

The test tires mounted on wheel rims of size 17×7.0J (tire pressure: front 230 kPa, rear 210 kPa) were attached to a test car (1600 cc front wheel drive passenger car) and tested for uneven wear resistance and noise performance as follows:

21 Uneven Wear Resistance Test>

The test car was traveled for a predetermined distance and then the tread portion was visually checked for the wear condition especially of the first middle land portion and therearound.

The results are indicated in Table 1 by an index based on Comparative example Ref being 100, wherein the larger the value, the better the uneven wear resistance.

<Noise Performance Test>

During the test car was running on a dry asphalt road surface, noise was evaluated by the test driver, The results are indicated in Table 1 by an index based on Comparative example Ref being 100, wherein the larger the value, the better the noise performance.

TABLE 1

|  | Tire | | | | | |
| --- | --- | --- | --- | --- | --- | --- |
|  | Ref | Ex. 1 | Ex. 2 | Ex. 3 | Ex. 4 | Ex. 5 |
| maximum protrusion amount first middle profile d1 (mm) | 0.10 | 0.15 | 0.15 | 0.15 | 0.15 | 0.15 |
| second middle profile d2 (mm) | 0.10 | 0.05 | 0.03 | 0.04 | 0.06 | 0.07 |
| d2/d1 (%) | 100 | 33 | 20 | 27 | 40 | 47 |
| crown profile d3 (mm) | 0.10 | 0.10 | 0.08 | 0.09 | 0.11 | 0.12 |
| d3/d1 (%) | 100 | 67 | 53 | 60 | 73 | 80 |
| uneven wear resistance | 100 | 110 | 108 | 109 | 110 | 109 |
| noise performance | 100 | 115 | 117 | 116 | 113 | 111 |

|  | Tire | | | | |
| --- | --- | --- | --- | --- | --- |
|  | Ex. 6 | Ex. 7 | Ex. 8 | Ex. 9 | Ex. 10 |
| maximum protrusion amount first middle profile d1 (mm) | 0.25 | 0.25 | 0.25 | 0.25 | 0.25 |
| second middle profile d2 (mm) | 0.04 | 0.06 | 0.08 | 0.10 | 0.12 |
| d2/d1 (%) | 16 | 24 | 32 | 40 | 48 |
| crown profile d3 (mm) | 0.14 | 0.16 | 0.18 | 0.20 | 0.22 |
| d3/d1 (%) | 56 | 64 | 72 | 80 | 88 |
| uneven wear resistance | 108 | 109 | 110 | 110 | 108 |
| noise performance | 118 | 117 | 116 | 114 | 111 |

From the test results, it was confirmed that the tires according to the present disclosure exhibited excellent uneven wear resistance and excellent noise performance.

Statement of the Present Disclosure

The present disclosure is as follows:

Disclosure 1: A tire comprising a tread portion having a first tread edge to be positioned inboard of a vehicle and a second tread edge to be positioned outboard of the vehicle, wherein
    the tread portion is provided with circumferential grooves extending continuously in the tire circumferential direction to axially divide the tread portion into land portions,
    the land portions include
    a crown land portion,
    a first middle land portion adjacent to the crown land portion on the first tread edge side thereof, and
    a second middle land portion adjacent to the crown land portion on the second tread edge side thereof, and
    in a meridian cross section of the tire under a normal state of the tire, the crown land portion, the first middle land portion and the second middle land portion respectively have a crown profile, a first middle profile and a second middle profile which protrude radially outwardly from respective reference tread profiles, wherein
    a maximum protrusion amount of the first middle profile from the reference tread profile therefor is larger than
    a maximum protrusion amount of the crown profile from the reference tread profile therefor which is larger than a maximum protrusion amount of the second middle profile from the reference tread profile therefor.

Disclosure 2: The tire according to Disclosure 1, wherein the maximum protrusion amount of each of the crown profile, the first middle profile and the second middle profile is not more than 0.15 mm.

Disclosure 3: The tire according to Disclosure 1 or 2, wherein the maximum protrusion amount of the crown profile is in a range from 60% to 75% of the maximum protrusion amount of the first middle profile.

Disclosure 4: The tire according to Disclosure 1, 2 or 3, wherein the maximum protrusion amount of the second middle profile is in a range from 25% to 40% of the maximum protrusion amount of the first middle profile.

Disclosure 5: The tire according to Disclosure 1, 2, 3 or 4, wherein each of the crown land portion, the first middle land portion and the second middle land portion is provided with lateral grooves arranged at 75 to 100 pitches over the circumference of the tire.

Disclosure 6: The tire according to any one of Disclosures 1 to 5, wherein the circumferential grooves include a first shoulder circumferential groove positioned on the most first tread edge side, and a second shoulder circumferential groove positioned on the most second tread edge side, and the maximum groove width of the second shoulder circumferential groove is smaller than the maximum groove width of the first shoulder circumferential groove.

Disclosure 7: The tire according to Disclosure 6, wherein the maximum groove width of the second shoulder circumferential groove is in a range from 55% to 65% of the maximum groove width of the first shoulder circumferential groove.

Disclosure 8: The tire according to any one of Disclosures 1 to 7, wherein each of the first middle land portion and the second middle land portion is provided with lateral grooves inclined at an angle of 10 to 30 degrees with respect to the tire axial direction.

DESCRIPTION OF THE REFERENCE SIGNS 2 tread portion
3 circumferential groove
9 land portion
10 crown land portion
11 first middle land portion
12 second middle land portion
44 reference tread profile
45 crown profile
46 first middle profile
47 second middle profile
T1 first tread edge
T2 second tread edge

The invention claimed is:

1. A tire comprising a tread portion having a first tread edge to be positioned inboard of a vehicle and a second tread edge to be positioned outboard of the vehicle, wherein
the tread portion is provided with circumferential grooves extending continuously in the tire circumferential direction to axially divide the tread portion into land portions,
the land portions include a crown land portion, a first middle land portion adjacent to the crown land portion on the first tread edge side thereof, and a second middle land portion adjacent to the crown land portion on the second tread edge side thereof, and
in a meridian cross section of the tire under a normal state of the tire, the crown land portion, the first middle land portion and the second middle land portion respectively have a crown profile, a first middle profile and a second middle profile which protrude radially outwardly from respective reference tread profiles, wherein
a maximum protrusion amount of the first middle profile from the reference tread profile therefor is larger than a maximum protrusion amount of the crown profile from the reference tread profile therefor, which is larger than a maximum protrusion amount of the second middle profile from the reference tread profile therefor,
the reference tread profile of the first middle land portion is a circular arc having a single radius and passing through an axially innermost edge and an axially outermost edge of a ground contacting surface of the first middle land portion, and a groove edge on a tire equator side of a first crown circumferential groove axially inwardly adjacent to the first middle land portion,
the reference tread profile of the second middle land portion is a circular arc having a single radius and passing through an axially innermost edge and an axially outermost edge of a ground contacting surface of the second middle land portion, and a groove edge on the tire equator side of a second crown circumferential groove axially inwardly adjacent to the second middle land portion, and
the reference tread profile of the crown land portion is a circular arc having a single radius and passing through an axially innermost edge and an axially outermost edge of a ground contacting surface of the crown land portion, a groove edge on the first tread edge side of the first crown circumferential groove, and a groove edge on the second tread edge side of the second crown circumferential groove,
wherein
the crown land portion includes crown lateral grooves extending across the entire axial width of the crown land portion,
each of the crown lateral grooves is made up of a first axial end portion, a second axial end portion and a central portion extending therebetween,
the first axial end portion, the second axial end portion, and the central portion of each of the crown lateral grooves are inclined with respect to the tire axial direction in a first direction, and an angle of the first axial end portion and an angle of the second axial end portion with respect to the tire axial direction are smaller than an angle of the central portion with respect to the tire axial direction,
a groove width in the central portion is smaller than a groove width in the first axial end portion and a groove width in the second axial end portion,
the first middle land portion is provided with first middle lateral grooves and first middle narrow grooves each traversing the entire axial width of the first middle land portion, and alternately arranged in the tire circumferential direction,
the second middle land portion is provided with second middle lateral grooves and second middle narrow grooves each traversing the entire axial width of the second middle land portion, and alternately arranged in the tire circumferential direction, each of the second middle lateral grooves is provided with a narrow groove portion on the second tread end side, but each of the first middle lateral grooves is not provided with a narrow groove portion, the first middle lateral grooves, the first middle narrow grooves, the second middle lateral grooves, and the second middle narrow grooves are inclined in a second direction opposite to the first direction with respect to the tire axial direction, the land portions include a first shoulder land portion adjacent to the first middle land portion on the first tread edge side thereof, and a second shoulder land portion adjacent to the second middle land portion on the second tread edge side thereof, the first shoulder land portion is provided with first shoulder lateral grooves and first shoulder narrow grooves alternately arranged in the tire circumferential direction, each of the first shoulder lateral grooves and the first shoulder narrow grooves traverses the entire axial width of the first shoulder land portion, the second shoulder land portion is provided with second shoulder lateral grooves and second shoulder narrow grooves alternately arranged in the tire circumferential direction, the second shoulder narrow grooves traverse the entire axial width of the second shoulder land portion, while the second shoulder lateral grooves extend axially inward from the second tread edge and end within the second shoulder land portion, each of the second shoulder lateral grooves comprises an axially end portion formed as a narrow groove portion terminated within the second shoulder land portion, and each of the first shoulder lateral grooves comprises an axially end portion formed as a narrow groove portion opened to a first shoulder circumferential groove adjacent to the first shoulder land portion.

2. The tire according to claim 1, wherein
the maximum protrusion amount of each of the crown profile, the first middle profile and the second middle profile is not more than 0.15 mm.

3. The tire according to claim 2, wherein
the maximum protrusion amount of the crown profile is in a range from 60% to 75% of the maximum protrusion amount of the first middle profile.

4. The tire according to claim 3, wherein
the maximum protrusion amount of the second middle profile is in a range from 25% to 40% of the maximum protrusion amount of the first middle profile.

5. The tire according to claim 2, wherein
the first middle lateral grooves and the second middle lateral grooves are inclined at an angle of 10 to 30 degrees with respect to the tire axial direction.

6. The tire according to claim 1, wherein
the circumferential grooves include a second shoulder circumferential groove positioned closest to the second tread edge, and
the maximum groove width of the second shoulder circumferential groove is smaller than the maximum groove width of the first shoulder circumferential groove.

7. The tire according to claim 6, wherein
the maximum groove width of the second shoulder circumferential groove is in a range from 55% to 65% of the maximum groove width of the first shoulder circumferential groove.

8. The tire according to claim 1, wherein
the first middle lateral grooves and the second middle lateral grooves are inclined at an angle of 10 to 30 degrees with respect to the tire axial direction.

9. The tire according to claim 1, wherein
the crown land portion is displaced from the tire equator toward the second tread edge.

10. The tire according to claim 1, wherein
the first shoulder lateral grooves, the first shoulder narrow grooves, the second shoulder lateral grooves and the second shoulder narrow grooves are inclined in the second direction opposite to the first direction with respect to the tire axial direction.

11. The tire according to claim 1, wherein
the crown lateral grooves, the first middle lateral grooves, the second middle lateral grooves, the first shoulder lateral grooves, and the second shoulder lateral grooves are arranged at 75 to 100 pitches over the circumference of the tire.

12. The tire according to claim 1, wherein
in each of the crown lateral grooves, the first axial end portion has a maximum groove width, the second axial end portion has a maximum groove width, and the central portion has a substantially constant groove width, and
the groove width in the central portion is not more than 15% of the maximum groove width in the first axial end portion, and not more than 15% of the maximum groove width in the second axial end portion.

* * * * *